United States Patent [19]
Schindler et al.

[11] 3,863,021
[45] Jan. 28, 1975

[54] MOLDED ELECTRICAL JUNCTION BOX

[75] Inventors: Edgar C. Schindler, Seattle; John C. McEachron, Tacoma, both of Wash.

[73] Assignee: Nelco Corporation, Kent, Wash.

[22] Filed: June 22, 1972

[21] Appl. No.: 265,341

Related U.S. Application Data

[62] Division of Ser. No. 69,266, Sept. 3, 1970, Pat. No. 3,701,451.

[52] U.S. Cl. .................................. 174/53, 220/27
[51] Int. Cl. ........................................... H02g 3/08
[58] Field of Search ........................... 174/53–58; 220/27, 3.2–3.6

[56] References Cited
UNITED STATES PATENTS

| | | | |
|---|---|---|---|
| 1,264,450 | 4/1918 | Sweet | 220/27 |
| 1,737,718 | 12/1929 | Hausmann | 220/27 |
| 2,016,284 | 10/1935 | Knight | 220/27 X |
| 3,176,869 | 4/1965 | Kinney | 174/58 X |
| 3,353,701 | 11/1967 | Palmer | 220/3.5 |

*Primary Examiner*—J. V. Truhe
*Assistant Examiner*—David A. Tone
*Attorney, Agent, or Firm*—Ernest S. Kettelson; Harold J. Rathbun

[57] ABSTRACT

Knockout port structure and knockout means associated therewith for use in a molded electrical outlet box, junction box or the like is provided in which the port extends through a wall of the box and is provided with peripheral recesses extending around at least a portion of the periphery of the port. The knockout is attached to the wall members at the base of the peripheral recesses so that, when the knockout is broken away from the wall structure, any jagged edges remaining are recessed away from the conductor-engaging surface of the knockout port.

7 Claims, 9 Drawing Figures

PATENTED JAN 28 1975

MOLDED ELECTRICAL JUNCTION BOX

RELATED APPLICATIONS

This application is a division of our prior copending application Ser. No. 69,266 filed Sept. 3, 1970 now U.S. Pat. No. 3,701,451 having the same title.

BACKGROUND OF THE INVENTION

This invention relates to knockout aperture structure for junction boxes and electrical outlet boxes.

This invention further relates to molded electrical junction boxes, fuse boxes, outlet boxes and other enclosures which have a plurality of knockouts designed to be readily removable for insertion of electrical wires.

PRIOR ART

Junction boxes, outlet boxes and other enclosures of the general type with which the invention herein is concerned are usually rugged die-cast aluminum housings, molded plastic boxes or stamped and formed sheet metal housings having a number of wall segments which may be removed by impact or manipulation with tools from the outside of the box. It is usually very difficult to remove these knockouts from the interior of the box since no means is provided for ready manipulation and access from the interior. Other types of outlet boxes are known to the prior art in which plastic materials are molded into an open topped receptacle; however, the knockout segments provided in these devices suffer similarly from the problem of inaccessibility from the interior of the box. Removal of the molded knockout segment usually leaves a jagged, rough surface exposed to the wires, frequently abrading the insulation on the wires. The junction boxes with which this invention is concerned are intended to enable the mounting of a variety of electrical appliances, such as switches, electrical receptacles and convenience outlets.

OBJECTS OF THE INVENTION

It is an object of this invention to provide a molded electrical outlet box constructed of a lightweight and inexpensive material which is easy to manufacture. A related object of this invention is to provide an open-topped molded insulation wiring box which may be constructed utilizing injection molding techniques.

A primary object of this invention is to provide a knockout structure which presents a smooth-edged opening to any conductors placed therein after the knockout blank has been removed.

These and other objects and advantages of this invention will become more readily apparent by an evaluation of the description of several preferred embodiments of this invention as set out below with particular reference to the attached drawings.

Figure 1:
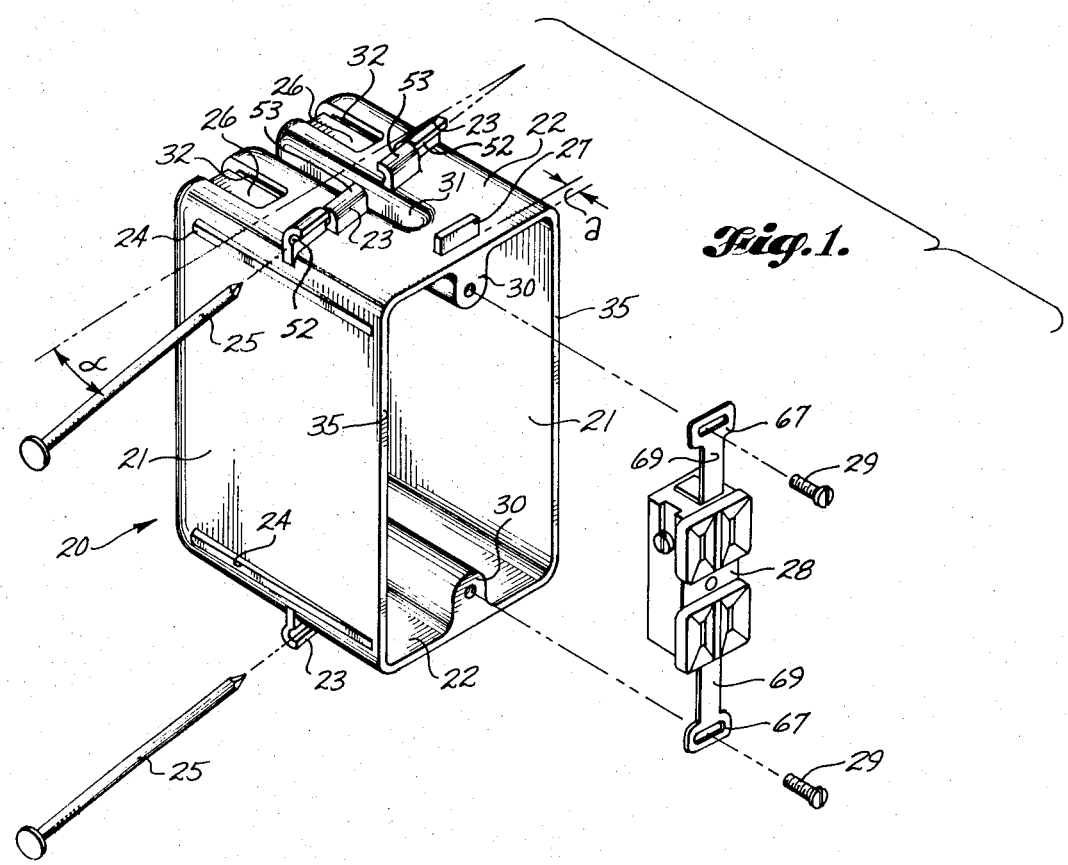
FIG. 1 shows an exploded perspective view of one embodiment of this invention which is a deep-wall style outlet or junction box suitable for standard building applications.

Referring more particularly to the drawings, wherein like numerals indicate like parts, there is seen in FIG. 1 an outlet box indicated generally at 20 which is of the deep-wall style having a standard size aperture defined by front face 35 into which an appliance such as the convenience outlet 28 may be inserted. The deep-wall molded junction box 20 has side walls 21, end walls 22 and a plurality of knockout elements 26 placed in the end walls 22. A pair of fastener ears 23 are molded as an integral part of each end wall 22 and provide means for attaching the box to a structural member by use of nails 25. The fastener ears 23 are set at an angle α with respect to the rear wall of the junction box 20 to permit easier access to nails 25 for nailing the box to the structural member. A threaded lug member 30 is molded into each end wall 22 and the ridge formed thereby extends completely through to the back wall 39. A slot 31 extends partially along the exterior of side wall 22 and serves to decrease the amount of plastic necessary to form the box while permitting the box to be formed by injection molding techniques. The threaded lug member 30 must extend completely to the back wall 39 of the box 20 to permit rlease of the box from the mold. A depth guide 27 is provided on each end wall to insure that the front face 35 of the box is flush with the outer surface of the wall board or panelling used on the wall.

Figure 2:
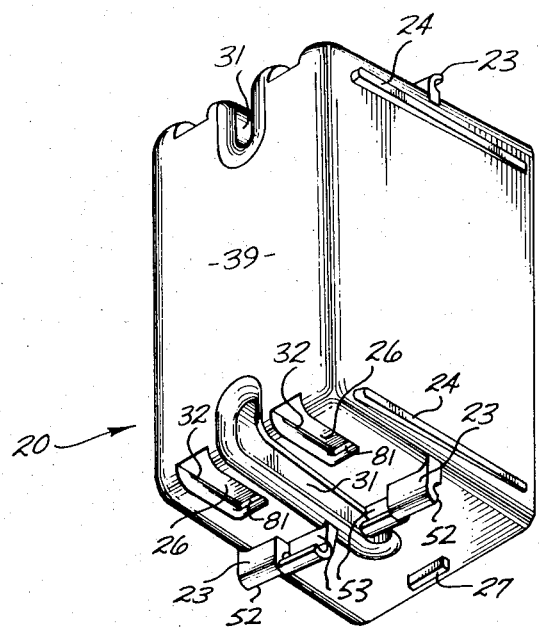
FIG. 2 shows a bottom perspective view of the device shown in FIG. 1.

An important feature of this invention is to provision of the tapered ribs 24 along the outer portion of the side walls 21 of the deep-wall molded junction box. Ribs 24 are provided to properly orient the side wall of the box so that the front wall 35 will be precisely perpendicular to the structural member to which the box is attached. It is necessary to provide the tapered ribs 24 so that the injection molding techniques well known in the art may be utilized to form the box. A draft angle equivalent to the angle γ must be imparted to the side walls in order to insure release of the box from the mold. The tapered ribs 24 thus are formed in the side walls 21 of the boxes 20 so that adjacent the front wall 35 the ridge is flush with the surface of side wall 21. Extending toward the rearward portion of the box the width of the rib 24 increases so that the upper surface of rib 24 remains perpendicular to the front face 35, and thus extends at the angle γ with respect to side wall 21. The tapered ribs 24 are particularly useful in the deep-wall molded junction box 20 as shown in FIGS. 1 and 2. However it may be used in all embodiments of this invention if desired.

An appliance such as the convenience outlet 28 may be readily connected to wires extending into the interior of the box through knockouts 26 and the appliance then pushed back into contact with the threaded lug member 30 with screw 29 threadably engaging the interior of threaded lug member 30. The ears 67 of convenience outlet 28 are engaged by screw 29 to firmly hold the convenience outlet 28 in its proper position within the box 20.

Figure 3:
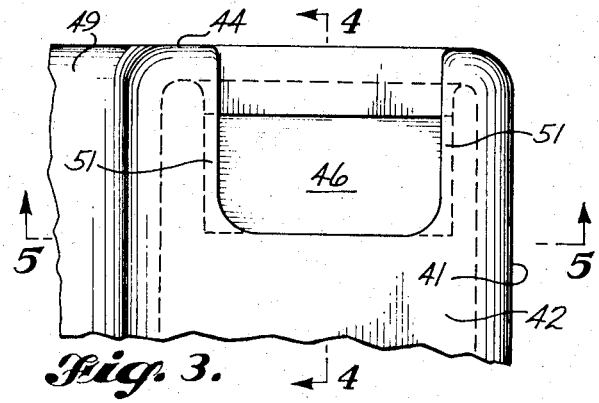
FIG. 3 is a partial plan view of one embodiment of the knockouts of this invention.
Figure 4:
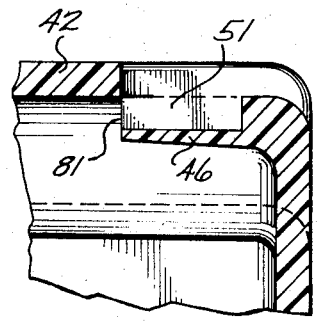
FIG. 4 is a partial cross section of the knockout area shown in FIG. 3 taken along lines 8—8.
Figure 5:
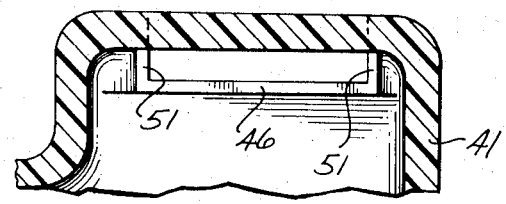
FIG. 5 is a partial cross section of the knockout area shown in FIG. 3 taken along lines 9—9 of FIG. 3.

In FIGS. 3–5, one form of knockout port structure and knockout means is shown which may be used with the box structure shown in FIG. 1 or with other types of molded electrical enclosures. In this embodiment of a knockout structure, webs 51 connect the knockout means 46 with wall 42 and are so constructed that by inserting a screwdriver through the aperture 81 and twisting the screwdriver, it is possible to remove the knockout for insertion of an insulated conductor into the interior of the box. However, it has been found that the frangible web 51 frequently leaves sharp projecting segments attached to wall 42 which are exposed to and frequently contact the surface of conductors which are inserted into the knockout. Such protruding areas may abrade the insulation on the conductors and thus create a potential hazzard in the usage of boxes equipped with such knockout port structure and knockout means.

Figure 6:
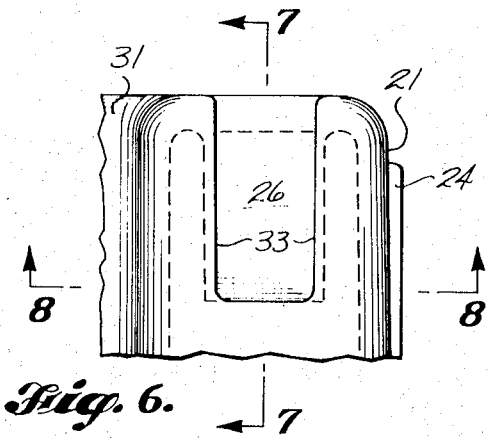
FIG. 6 is a partial plan view of a preferred embodiment of the knockout port structure and knockout means associated therewith used in the device shown in FIG. 1.
Figure 7:
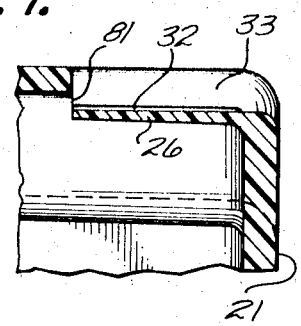
FIG. 7 is a partial cross-sectional view of the knockout area shown in FIG. 6 taken along lines 11—11 of FIG. 6.
Figure 8:
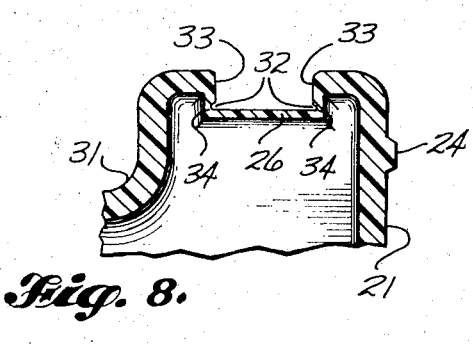
FIG. 8 is a partial cross-sectional view of the knockout area shown in FIG. 6 taken along lines 12—12 of FIG. 10.

It has been found that by recessing the webs connecting the knockouts to the wall structure of an electrical outlet box, junction box or similar electrical enclosure, it is possible to avoid contact of any jagged portions of the frangible web remaining attached to the box with the insulating surface of the conductors. FIGS. 6–9 show embodiments of such knockout port structure and knockout means to accomplish this end. The knockout sections 26 are thin molded sections constructed of the same material as makes up the rest of the box 20 and are each formed with a slotted aperture 81 opening into the interior of the box. Each aperture 81 is formed so that the blade of a screwdriver may be inserted into the aperture and the knockout 26 removed by twisting the blade to fracture the thin webs 34 of plastic material by which the knockouts are interconnected with the walls 22 of the box, the webs being undercut at 32, moreover, to facilitate the operation. In FIGS. 6, 7 and 8, the details of the preferred form of knockouts 26 and the surrounding structure of box 20 is shown. The straight entry port, which is opened by removing the knockout, presents a smooth surface to any conductor entering the box to eliminate the possibility of severing or otherwise injuring the insulation thereon. The recesses 32 of the webs along the sides of the port 33 insure that no jagged edges will be presented to the conductor inserted through the port after removal of the knockout blank.

Figure 9:
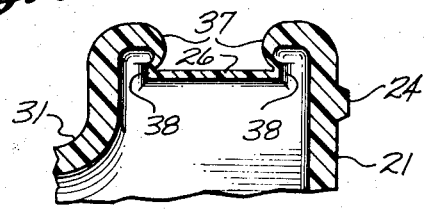
FIG. 9 is a cross-sectional view of a second embodiment of the knockout port structure and knockout means associated therewith.

In FIG. 9, another embodiment of the knockout port structure and knockout means associated therewith is shown in which the knockout port structure has a curved interior surface 37 extending from the exterior surface of wall 21 into engagement with the web 38, thus creating a recessed portion as shown in the drawings. The knockout 26 is connected to one end of the web 38. Thus, when web 38 is broken in the process of removing the knockout means 26, the conductor-engaging surface of the entry port 37 prevents contact of any jagged edges of web 38 remaining attached to the box with a conductor means inserted through the now unobstructed knockout port. In this embodiment, the convex curved surface of the knockout port 37 ensures that a conductor will encounter only the smooth interior surfaces and will avoid abrasion of the conductor's insulation on any protruding web segments.

The deep-wall molded junction box 20 is provided with end wall nail guides 23 which are inclined at the angle $\alpha$ with respect to the front face 35 to facilitate installation of the outlet box in a standard wall construction. Angling the nail holders 23 with respect to the front wall 35 gives easy access to the nails or other fasteners being used to hold the outlet box 20 to the wall studs. The fastener ears 23 are molded integrally with the junction box and are designed to accept a standard nail or other fastener. The fastener ears 23 are constructed by molding a forward facing portion 52 and a rearward facing portion 53 by injection molding techniques well-known in the art.

The deep-wall molded junction box 20 may be utilized in any situation in which two-by-four timbers or similar structural elements serve as the structural supports for the walls. Adequate volume to meet the standards specified in the various applicable building codes can readily be provided in the interior of the box 20 whenever there is adequate room for this style of box in the wall structure. The box 20 can of course be made in double or triple widths to accommodate gangs of switches or a plurality of convenience outlets or other types of electrical apparatus, switching gear and the like, which are to be mounted in the interior of a wall.

The materials of construction which may be utilized in this invention include any of the normally utilized injection moldable plastics such as phenolic resins and the like. It is particularly desirable to utilize a material which has good mold release characteristics since the intricate shapes necessary to mold the junction box of this invention may result in the adherence of the mold to the material unless the proper material is used. However, the design of this box results in several desirable design features which enhance the mold release characteristics. For example, the provision of the ridges adjacent the dihedral corners of the junction box permit a larger draft angle to be molded into the box than was previously thought to be desirable or possible. The nailing means with which the box is attached to structural members is also designed for simple mold release with adequate structural strength to hold the box in its proper position.

While the present invention has been described with particular reference to specific examples, it will be apparent to those skilled in the art that various changes and modifications may be made thereto.

What is claimed is:

1. Knockout port structure and knockout means associated therewith for use in a molded electrical outlet box, junction box or the like having a wall member through which said port extends, comprising a port extending through said wall, the peripheral edge of said wall bounding said port including a recessed region formed therein, a projecting face region formed in said edge extending radially inward beyond said recessed region, said projecting face region having a relatively smooth surface, removable knockout means substantially closing said port, said knockout means being attached along said recessed region by frangible means, said smooth surface of said projecting face region extending radially inward beyond said recessed region a distance greater than the inward radial projection of jagged edges which may result from breaking away said knockout means along said recessed region.

2. The knockout port structure as set forth in claim 1, wherein said knockout means is positioned within the interior of said molded electrical outlet box, junction box or the like.

3. The knockout port structure as set forth in claim 1, wherein said relatively smooth surface of said projecting face region around said peripheral edge extends substantially perpendicular to the side of said wall.

4. The knockout port structure as set forth in claim 1, wherein said projecting face region around said peripheral edge has a relatively smooth convex surface.

5. The knockout port structure as set forth in claim 1, wherein said frangible means is a web integrally joining said knockout means to said recessed region.

6. The knockout port structure as set forth in claim 1, wherein said frangible means includes a weakened junction segment of said wall formed therein between said recessed region and said knockout means.

7. The knockout port structure as set forth in claim 6, wherein said weakened junction segment is an undercut groove.

* * * * *